United States Patent
Hapsari et al.

(10) Patent No.: US 9,591,505 B2
(45) Date of Patent: Mar. 7, 2017

(54) RADIO BASE STATION FOR MINIMISATION OF DRIVE TESTS (MDT)

(71) Applicant: NTT DOCOMO, INC., Tokyo (JP)

(72) Inventors: Wuri Andarmawanti Hapsari, Tokyo (JP); Kenichiro Aoyagi, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/416,402

(22) PCT Filed: Jul. 29, 2013

(86) PCT No.: PCT/JP2013/070420
§ 371 (c)(1),
(2) Date: Jan. 22, 2015

(87) PCT Pub. No.: WO2014/021239
PCT Pub. Date: Feb. 6, 2014

(65) Prior Publication Data
US 2015/0181451 A1    Jun. 25, 2015

(30) Foreign Application Priority Data
Aug. 3, 2012 (JP) .................................. 2012-173356

(51) Int. Cl.
*H04W 24/10* (2009.01)
*H04W 76/02* (2009.01)
(Continued)

(52) U.S. Cl.
CPC ........... *H04W 24/10* (2013.01); *H04W 16/18* (2013.01); *H04W 64/00* (2013.01); *H04W 76/02* (2013.01)

(58) Field of Classification Search
CPC ..... H04W 24/10; H04W 76/02; H04W 16/18; H04W 64/00
See application file for complete search history.

(56) References Cited

U.S. PATENT DOCUMENTS

2013/0035085 A1*  2/2013  Axell et al. ................... 455/419
2013/0178224 A1   7/2013  Chang et al.
(Continued)

FOREIGN PATENT DOCUMENTS

EP          2566232 A1    3/2013
WO      2010/140797 A2    12/2010
(Continued)

OTHER PUBLICATIONS

Written Opinion for corresponding International Application No. PCT/JP2013/070420, mailed Oct. 8, 2013 (3 pages).
(Continued)

*Primary Examiner* — Brandon Miller
(74) *Attorney, Agent, or Firm* — Osha Liang LLP

(57) ABSTRACT

In "Immediate MDT," location information on a mobile station UE is acquired along with "(MDT) MeasurementReport" for all "Trigger Types." A setting unit 11 of a radio base station eNB according to the present invention is configured to be able to set "MeasConfig" and "includeLocInfo" to "RRCConnectionReconfiguration," set "MeasObjectId," "ReportConfigId," and "MeasId" to the "MeasConfig," and indicate in the "includeLocInfo" that location information on the mobile station UE is to be attached to "(MDT) MeasurementReport."

1 Claim, 8 Drawing Sheets

(51) Int. Cl.
H04W 16/18 (2009.01)
H04W 64/00 (2009.01)

(56) References Cited

U.S. PATENT DOCUMENTS

| | | | | |
|---|---|---|---|---|
| 2013/0208601 A1* | 8/2013 | Cui | ....................... | H04W 24/10 |
| | | | | 370/252 |
| 2013/0260741 A1* | 10/2013 | Yamada | ................ | H04W 24/00 |
| | | | | 455/422.1 |
| 2014/0087715 A1* | 3/2014 | Suzuki et al. | ............. | 455/422.1 |

FOREIGN PATENT DOCUMENTS

| | | |
|---|---|---|
| WO | 2011/136352 A1 | 11/2011 |
| WO | 2012/039440 A1 | 3/2012 |

OTHER PUBLICATIONS

International Search Report for corresponding International Application No. PCT/JP2013/070420, mailed Oct. 8, 2013 (1 page).
NTT DOCOMO, Inc. et al.; "Reporting Triggers for Immediate MDT;" 3GPP TSG-RAN2#78, R2-122535; Prague, Czech; May 21-25, 2012 (3 pages).
3GPP TS 37.320 V11.0.0; "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11);" Jun. 2012 (20 pages).
3GPP TS 36.331 V11.0.0; "3rd Generation Partnership Project; Technical Specification Group Radio Access Network; Evolved Universal Terrestrial Radio Access (E-UTRA); Radio Resource Control (RRC); Protocol specification (Release 11);" Jun. 2012 (302 pages).
Notice of Grounds for Rejection for Japanese Application No. 2012-173356, mailed Oct. 8, 2013 (5 pages).
Extended Search Report issued in corresponding European Application No. 13826507.9, mailed Aug. 21, 2015 (10 pages).
NTT DOCOMO, Inc.; "Reporting Triggers for Immediate MDT"; 3GPP TSG-RAN2#77bis, R2-121542; Jeju, South Korea; Mar. 26-30, 2012 (3 pages).
Samsung; "Event-triggered reporting for Rel-11 immediate MDT"; 3GPP TSG RAN WG2 #78, R2-122427; Prague, Czech Republic; May 21-25, 2012 (6 pages).
3GPP TS 36.331 V10.6.0; "LTE; Evolved Universal Terrestrial Radio Access (E-UTRA); Radio Resource Control (RRC); Protocol specification"; ETSI TS 136 331 (Release 10); Jul. 2012 (306 pages).

* cited by examiner

FIG. 3

```
RRCConnectionReconfiguration ::=    SEQUENCE {
    rrc-TransactionIdentifier           RRC-TransactionIdentifier,
    criticalExtensions                  CHOICE {
        c1                              CHOICE {
            rrcConnectionReconfiguration-r8     RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture        SEQUENCE {}
    }
}

RRCConnectionReconfiguration-r8-IEs ::= SEQUENCE {
    measConfig                          MeasConfig                                      OPTIONAL,   -- Need ON
    mobilityControlInfo                 MobilityControlInfo                             OPTIONAL,   -- Cond HO
    dedicatedInfoNASList                SEQUENCE (SIZE (1..maxDRB)) OF
                                        DedicatedInfoNAS                                OPTIONAL,   -- Cond nonHO
    radioResourceConfigDedicated        RadioResourceConfigDedicated                    OPTIONAL,   -- Cond HO - toEUTRA
    securityConfigHO                    SecurityConfigHO                                OPTIONAL,   -- Cond HO
    nonCriticalExtension                RRCConnectionReconfiguration-v890-IEs           OPTIONAL
}

RRCConnectionReconfiguration-v890-IEs ::= SEQUENCE {
    lateNonCriticalExtension            OCTET STRING                                    OPTIONAL,   -- Need OP
    nonCriticalExtension                RRCConnectionReconfiguration-v920-IEs           OPTIONAL
}

RRCConnectionReconfiguration-v920-IEs ::= SEQUENCE {
    otherConfig-r9                      OtherConfig-r9                                  OPTIONAL,   -- Need ON
    fullConfig-r9                       ENUMERATED {true}                               OPTIONAL,   -- CondHO - Reestab
    nonCriticalExtension                RRCConnectionReconfiguration-v1020-IEs          OPTIONAL
}

RRCConnectionReconfiguration-v1020-IEs ::= SEQUENCE {
    sCellToReleaseList-r10              SCellToReleaseList-r10                          OPTIONAL,   -- Need ON
    sCellToAddModList-r10               SCellToAddModList-r10                           OPTIONAL,   -- Need ON
    nonCriticalExtension                RRCConnectionReconfiguration-v11xx-IEs          OPTIONAL
}

RRCConnectionReconfiguration-v11xx-Ies ::= SEQUENCE {
    includeLocInfo-r11                  ENUMERATED {true}                               OPTIONAL
}
```

FIG. 5

```
-- ASN1START

ReportConfigEUTRA ::=              SEQUENCE {
    triggerType                        CHOICE {
        event                              SEQUENCE {
            eventId                            CHOICE {
                eventA1                            SEQUENCE {
                    a1-Threshold                       ThresholdEUTRA
                },
                eventA2                            SEQUENCE {
                    a2-Threshold                       ThresholdEUTRA
                },
                eventA3                            SEQUENCE {
                    a3-Offset                          INTEGER (-30..30),
                    reportOnLeave                      BOOLEAN
                },
                eventA4                            SEQUENCE {
                    a4-Threshold                       ThresholdEUTRA
                },
                eventA5                            SEQUENCE {
                    a5-Threshold1                      ThresholdEUTRA,
                    a5-Threshold2                      ThresholdEUTRA
                },
                ...,
                eventA6-r10                        SEQUENCE {
                    a6-Offset-r10                      INTEGER (-30..30),
                    a6-ReportOnLeave-r10               BOOLEAN
                }
            },
            hysteresis                         Hysteresis,
            timeToTrigger                      TimeToTrigger
        },
        periodical                         SEQUENCE {
            purpose                            ENUMERATED {
                                                   reportStrongestCells, reportCGI }
        }
    },
    triggerQuantity                    ENUMERATED {rsrp, rsrq},
    reportQuantity                     ENUMERATED {sameAsTriggerQuantity, both},
    maxReportCells                     INTEGER (1..maxCellReport),
    reportInterval                     ReportInterval,
    reportAmount                       ENUMERATED {r1, r2, r4, r8, r16, r32, r64, infinity},
    ...,
    [[  si-RequestForHO-r9                 ENUMERATED {setup}       OPTIONAL,    -- Cond reportCGI
        ue-RxTxTimeDiffPeriodical-r9       ENUMERATED {setup}       OPTIONAL     -- Need OR
    ]],
    [[  includeLocationInfo-r10            ENUMERATED {true}        OPTIONAL     -- Cond reportMDT
    ]],
    [[  includelocationInfo-r11            ENUMERATED {true}        OPTIONAL     -- Need OR
    ]]
}

ThresholdEUTRA ::=                 CHOICE {
    threshold-RSRP                     RSRP-Range,
    threshold-RSRQ                     RSRQ-Range
}

-- ASN1STOP
```

FIG. 6

```
-- ASN1START

ReportConfigInterRAT ::=            SEQUENCE {
    triggerType                         CHOICE {
        event                               SEQUENCE {
            eventId                             CHOICE {
                eventB1                             SEQUENCE {
                    b1-Threshold                        CHOICE {
                        b1-ThresholdUTRA                    ThresholdUTRA,
                        b1-ThresholdGERAN                   ThresholdGERAN,
                        b1-ThresholdCDMA2000                ThresholdCDMA2000
                    }
                },
                eventB2                             SEQUENCE {
                    b2-Threshold1                       ThresholdEUTRA,
                    b2-Threshold2                       CHOICE {
                        b2-Threshold2UTRA                   ThresholdUTRA,
                        b2-Threshold2GERAN                  ThresholdGERAN,
                        b2-Threshold2CDMA2000               ThresholdCDMA2000
                    }
                },
                ...
            },
            hysteresis                          Hysteresis,
            timeToTrigger                       TimeToTrigger
        },
        periodical                          SEQUENCE {
            purpose                             ENUMERATED {
                                                    reportStrongestCells,
                                                    reportStrongestCellsForSON,
                                                    reportCGI}
        }
    },
    maxReportCells                      INTEGER (1..maxCellReport),
    reportInterval                      ReportInterval,
    reportAmount                        ENUMERATED {r1, r2, r4, r8, r16, r32, r64, infinity},
    ...,
    [[  si-RequestForHO-r9             ENUMERATED {setup}        OPTIONAL    -- Cond reportCGI
    ]],
    [[  reportQuantityUTRA-FDD-r10     ENUMERATED {both}         OPTIONAL    -- Need OR
    ]],
    [[  includelocationInfo-r11        ENUMERATED {true}         OPTIONAL    -- Need OR
    ]]
}

ThresholdUTRA ::=           CHOICE {
    utra-RSCP                   INTEGER (-5..91),
    utra-EcN0                   INTEGER (0..49)
}

ThresholdGERAN ::=          INTEGER (0..63)

ThresholdCDMA2000 ::=       INTEGER (0..63)

-- ASN1STOP
```

```
ReportConfigEUTRA    ::=         SEQUENCE {
    triggerType                      CHOICE {
        event                            SEQUENCE {
            eventId                          CHOICE {
                eventA1                          SEQUENCE {
                    a1-Threshold                     ThresholdEUTRA },
                eventA2                          SEQUENCE {
                    a2-Threshold                     ThresholdEUTRA },
                eventA3                          SEQUENCE {
                    a3-Offset                        INTEGER (-30..30),
                    reportOnLeave                    BOOLEAN },
                eventA4                          SEQUENCE {
                    a4-Threshold                     ThresholdEUTRA },
                eventA5                          SEQUENCE {
                    a5-Threshold1                    ThresholdEUTRA,
                    a5-Threshold2                    ThresholdEUTRA },
                ...,
                eventA6-r10                      SEQUENCE {
                    a6-Offset-r10                    INTEGER (-30..30),
                    a6-ReportOnLeave-r10             BOOLEAN }
            },
            hysteresis                       Hysteresis,
            timeToTrigger                    TimeToTrigger
        },
        periodical                       SEQUENCE {
            purpose                          ENUMERATED {
                                                 reportStrongestCells, reportCGI }
        }
    },
    triggerQuantity                  ENUMERATED {rsrp, rsrq},
    reportQuantity                   ENUMERATED {sameAsTriggerQuantity, both},
    maxReportCells                   INTEGER (1..maxCellReport),
    reportInterval                   ReportInterval,
    reportAmount                     ENUMERATED {r1, r2, r4, r8, r16, r32, r64, infinity},
    ...,
    [[ includeLocationInfo-r10       ENUMERATED {true}             OPTIONAL,  -- Cond reportMDT
    ]]
}
```

FIG. 8

RADIO BASE STATION FOR MINIMISATION OF DRIVE TESTS (MDT)

TECHNICAL FIELD

The present invention relates to a radio base station.

BACKGROUND ART

LTE (Long Term Evolution) specifies a method called "MDT (Minimisation of Drive Tests, drive tests for measurement)" in which results of measurements on predetermined radio quality in an actual environment are collected from mobile stations UE to reduce effort and cost for drive tests performed by a communication carrier.

In "Immediate MDT" which is one mode of such MDT, a mobile station UE is configured to give a report to a network by attaching "LocationInfo (location information on the mobile station UE)" to "Measurement Report" only upon "event A2" and "Periodic measurement."

More specifically, as shown in FIG. 7, an operation and maintenance server OAM specifies either "event A2" or "Periodic measurement" as "Trigger Type" in "MDT Activation."

Upon receipt of the "MDT activation," a radio base station eNB performs "MDT Configuration" on the mobile station UE through "RRCConnectionReconfiguration."

In this event, when either one of "event A2" or "Periodic measurement" is specified as the aforementioned "Trigger Type," the radio base station eNB can set, as shown in FIG. 8, "includeLocInfo" in "ReportConfigEUTRA" within "MeasConfig" within "RRCConnectionReconfiguration," the "includeLocInfo" indicating that location information on the mobile station UE is to be attached.

PRIOR ART DOCUMENT

Non-Patent Document

Non-patent document 1: 3GPP 37.320
Non-patent document 2: 3GPP 36.331

SUMMARY OF THE INVENTION

However, the conventional "Immediate MDT" mode has a problem that the radio base station eNB cannot acquire the location information on the mobile station UE along with "(MDT) MeasurementReport" when the "Trigger Type" specified in the "MDT Activation" is other than "event A2" and "Periodic measurement" described above.

Thus, the present invention has been made in view of the above problem and has an objective of providing a radio base station capable of acquiring location information on a mobile station UE along with "(MDT) MeasurementReport" in "Immediate MDT" for all cases of "Trigger Type."

A first feature of the present invention is summarized as a radio base station including: a setting unit configured to be able to set information elements in a connection reconfiguration signal; and a transmission unit configured to transmit the connection reconfiguration signal to a mobile station. Here, the setting unit is configured to be able to set a measurement configuration information element and a location information attachment information element to the connection reconfiguration signal, the setting unit is configured to be able to set measurement target information identifying a measurement target for a measurement report, report configuration information identifying a report condition for the measurement report, and a measurement ID associating the measurement target information and the report configuration information with each other, to the measurement configuration information element, and the setting unit is configured to be able to indicate in the location information attachment information element that location information on the mobile station is to be attached to the measurement report.

A second feature of the present invention is summarized as a radio base station including: a setting unit configured to be able to set information elements in a connection reconfiguration signal to be transmitted to a mobile station; and a transmission unit configured to transmit the connection reconfiguration signal to the mobile station. Here, when a first measurement target for a measurement report, a first report condition for the measurement report, and a first measurement ID associating the first measurement target and the first report condition with each other are set as measurement configuration information for the mobile station, the setting unit is configured to set a report configuration addition information element and a measurement ID addition information element to a measurement configuration information element in the connection reconfiguration signal, the report configuration addition information element commanding to add a second report condition having the same content as the first report condition, the measurement ID configuration information element commanding to add a second measurement ID associating the first measurement target and the second report condition, and the setting unit is configured to set a location information attachment information element to a report configuration information element for the second report condition contained in the report configuration information element, the location information attachment information element indicating that location information on the mobile station is to be attached to the measurement report.

A third feature of the present invention is summarized as a radio base station including: a setting unit configured to be able to set information elements in a connection reconfiguration signal to be transmitted to a mobile station; and a transmission unit configured to transmit the connection reconfiguration signal to the mobile station. Here, when a measurement target for a measurement report, a report condition for the measurement report, and a measurement ID associating the measurement target information and the report configuration information with each other are set as measurement configuration information for the mobile station, the setting unit is configured to set a report configuration change information element to a measurement configuration information element within the connection reconfiguration signal, the report configuration change information element commanding to change a content of the report configuration information, the setting unit is configured to set a report configuration information element for the report condition to the report configuration change information element, and the setting unit is configured to set a location information attachment information element to the report configuration information element, the location information attachment information element indicating that location information on the mobile station is to be attached to the measurement report.

BRIEF DESCRIPTION OF THE DRAWINGS

FIG. 3 is a diagram showing a format example of an "RRCConnectionReconfiguration" message sent by the radio base station according to the first embodiment of the present invention.

FIG. 5 is a diagram illustrating an example of "ReportConfigEUTRA" sent by the radio base station according to Modification 1 of the present invention.

FIG. 6 is a diagram illustrating an example of "ReportConfigInterRAT" sent by the radio base station according to Modification 2 of the present invention.

FIG. 8 is a diagram illustrating the prior art.

DETAILED DESCRIPTION (Mobile Communication System According to the First Embodiment of the Present Invention)

Figure 1:
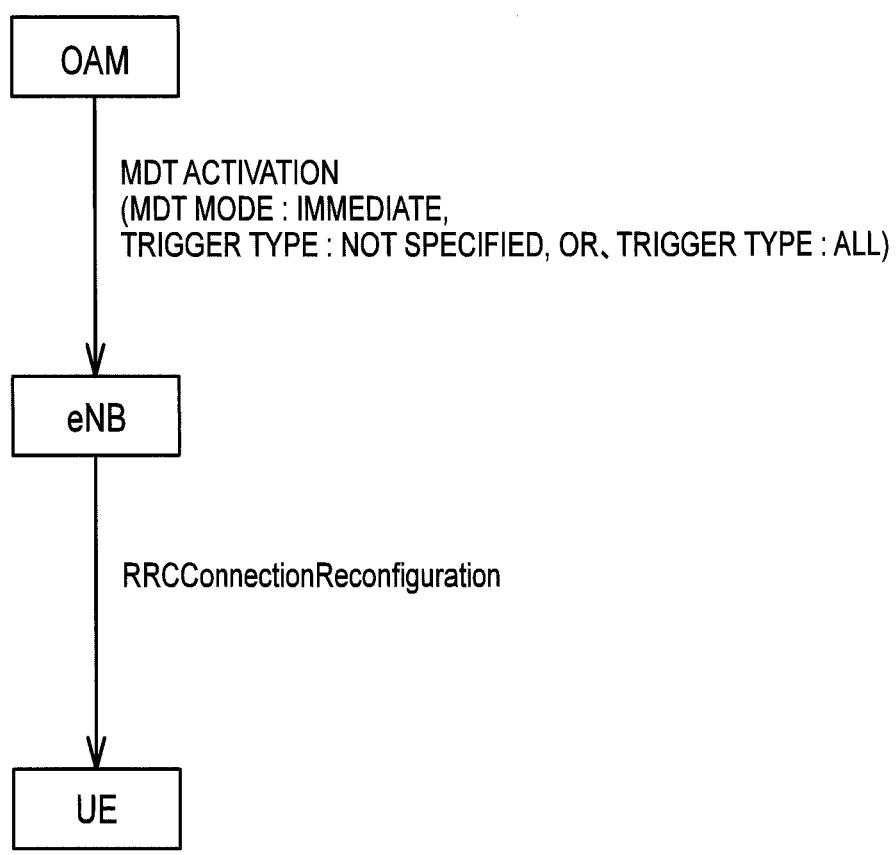
FIG. 1 is an overall configuration diagram of a mobile communication system according to a first embodiment of the present invention.
Figure 2:
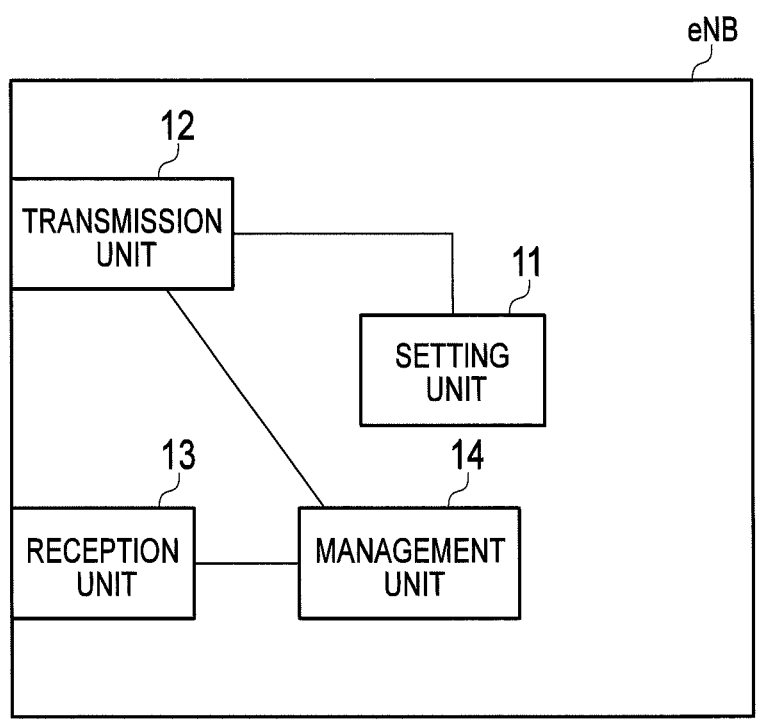
FIG. 2 is a functional block diagram of a radio base station according to the first embodiment of the present invention.

With reference to FIGS. 1 to 3, a mobile communication system according to a first embodiment of the present invention is described.

As shown in FIG. 1, the mobile communication system according to this embodiment includes an operation and maintenance server OAM and a radio base station eNB. Note that the mobile communication system according to this embodiment is capable of implementing "Immediate MDT" specified in the LTE Release-11.

As shown in FIG. 1, the operation and maintenance server OAM is configured to send the radio base station eNB "MDT Activation" in which "MDT mode" and "Trigger Type" are set.

If "Not Specified" or "All" is set in the "Trigger Type," then it is commanded to send location information on a mobile station UE along with "(MDT) MeasurementReport" for all "Trigger Types".

As shown in FIG. 2, the radio base station eNB according to this embodiment includes a setting unit 11, a transmission unit 12, a reception unit 13, and a management unit 14.

The transmission unit 12 is configured to send various signals to the operation and maintenance server OAM and the mobile station UE, while the reception unit 13 is configured to receive various signals from the operation and maintenance server OAM and the mobile station UE.

For example, the radio base station eNB is configured such that, when the reception unit 13 receives "MDT Activation" from the operation and maintenance server OAM, the transmission unit 12 sends "RRCConnectionReconfiguration" to the mobile station UE so that "MDT Configuration" may be performed on the mobile station UE.

The management unit 14 is configured to manage measurement configuration information set for each mobile station UE.

For example, the management unit 14 is configured to manage, as the measurement configuration information, "MeasObject" for "(MDT) MeasurementReport," "ReportConfig" for "(MDT) MeasurementReport," and "MeasId" that associates the "MeasObject" and the "ReportConfig" with each other.

The setting unit 11 is configured to be able to set information elements within the aforementioned "RRCConnectionReconfiguration."

The setting unit 11 is configured to set "MeasConfig" and "IncludeLocInfo" in "RRCConnectionReconfiguration" as shown in FIG. 3 if "Not Specified" or "All" is set to the aforementioned "Trigger Type."

In this case, the setting unit 11 is configured to be able to indicate in "includeLocInfo" that location information on the mobile station UE is to be attached to the "(MDT) MeasurementReport."

Note that, like in the conventional method, the setting unit 11 is configured to be able to set, in "MeasConfig," "MeasObjectId" identifying the "MeasObject" for the "(MDT) MeasurementReport," "ReportConfigId" identifying the "ReportConfig" for the "(MDT) MeasurementReport," and "MeasId" associating the "MeasObjectId" and the "ReportConfigId" with each other.

In the mobile communication system according to this embodiment, to minimize drive tests or to reduce effort and cost for drive tests performed by a communication carrier, the radio base station eNB can acquire location information on the mobile station UE not only via "MeasuremenReport" for "measurement ("Event A2" and "Periodic measurement")" indicating network coverage quality, but also via "MeasurementReport" for "measurement ("Event A3/A5/B1/B2")" involved in handover, by use of MDT.

In addition, in the mobile communication system according to this embodiment, measurement configuration information currently set for the mobile station UE can be modified to add the location information on the mobile station UE to the "MeasurementReport" for all "Trigger Types."

Moreover, in the mobile communication system according to this embodiment, also for the measurement configuration information to be set for the mobile station UE in the future, the mobile station UE can be commanded to add the location information on the mobile station UE to the "MeasurementReport" for all "Trigger Types."

(Modification 1)

A mobile communication system according to Modification 1 of the present invention is described with reference to FIG. 4. The following description of the mobile communication system according to Modification 1 focuses on differences from the mobile communication system according to the first embodiment.

Figure 4:
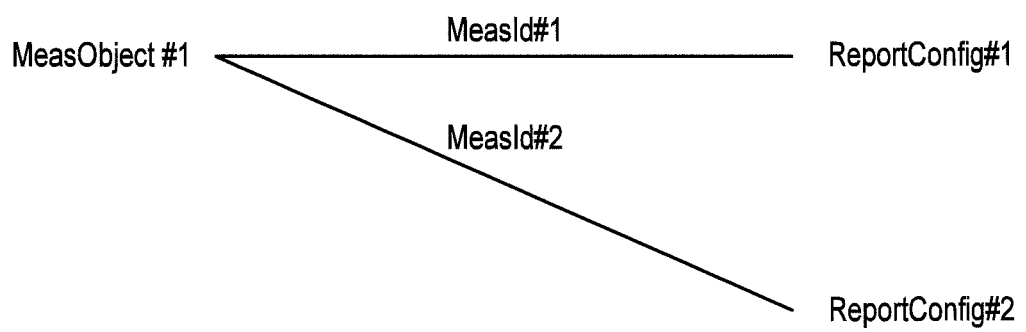
FIG. 4 is a diagram illustrating functions of radio base stations according to Modification 1 and Modification 2 of the present invention.
Figure 7:
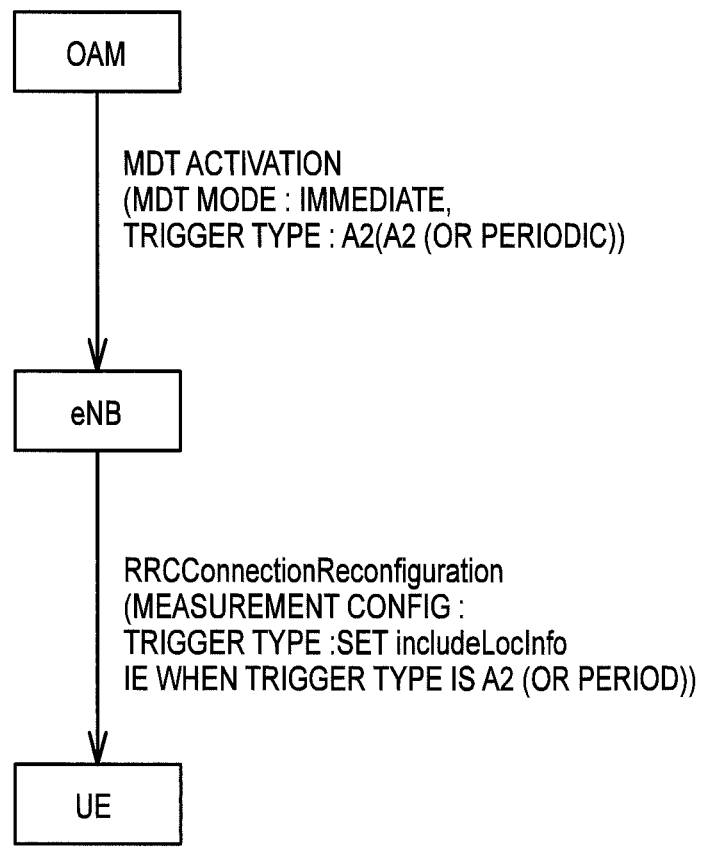
FIG. 7 is a diagram illustrating a prior art.

In the mobile communication system according to Modification 1, "MeasObject#1" for "(MDT) MeasurementReport," "ReportConfig#1" for the "(MDT) MeasurementReport," and "MeasId#1" associating the "MeasObject#1" and the "ReportConfig#1" with each other are currently set as measurement configuration information for the mobile station UE (see FIG. 4).

The setting unit 11 is configured to set "reportConfigToAddModList" commanding to add "ReportConfig#2" having the same contents as the aforementioned "ReportConfig#1" and "measIdToAddModList" commanding to add "MeasId#2" associating the "MeasObject#1" and the "ReportConfig#2" with each other, to "MeasConfig" within the "RRCConnectionReconfiguration" as shown in FIG. 4 if "Not Specified" or "All" is set to the aforementioned "Trigger Type."

In this case, the setting unit 11 is configured to set "includeLocInfo" to "ReportConfigEUTRA" for the "ReportConfig#2" contained in the "reportConfigToAddModList" as shown in FIG. 5, the "includeLocInfo" indicating that location information on the mobile station UE is to be attached to the "(MDT) MeasurementReport."

In the mobile communication system according to this modification of embodiment, the number of "ReportConfigs" and "MeasIds" set as the measurement configuration information for the mobile station UE doubles, but without changing the contents of the measurement configuration information currently set for the mobile station UE, the measurement configuration information can be modified to add location information on the mobile station UE to "MeasurementReport" for all "Trigger Types."

(Modification 2)

A mobile communication system according to Modification 2 of the present invention is described with reference to FIG. 4. The following description of the mobile communication system according to Modification 1 focuses on differences from the mobile communication systems according to the first embodiment and Modification 2.

In the mobile communication system according to Modification 2, "MeasObject#1" for "(MDT) MeasurementReport," "ReportConfig#1" for the "(MDT) MeasurementReport," and "MeasId#1" associating the "MeasObject#1" and the "ReportConfig#1" with each other are currently set as measurement configuration information for the mobile station UE (see FIG. 4).

The setting unit 11 is configured to set "reportConfigToAddModList" commanding to change the contents of "ReportConfig#1," to "MeasConfig" within "RRCConnectionReconfiguration" if "Not Specified" or "All" is set to the aforementioned "Trigger Type."

In this case, the setting unit 11 is configured to set "ReportConfigInterRAT" for "ReportConfig#1" to "reportConfigToAddModList," and to set "includeLocInfo" to the "ReportConfigInterRAT" as shown in FIG. 6, the "includeLocInfo" indicating that location information on the mobile station UE is to be attached to "(MDT) MeasurementReport".

In the mobile communication system according to this modification of embodiment, without increasing the number of "ReportConfigs" and "MeasIds" set as the measurement configuration information for the mobile station UE, the measurement configuration information currently set for the mobile station UE can be modified to add location information on the mobile station UE to "MeasurementReport" for all "Trigger Types."

The features of this embodiment described above may be expressed as follows.

A first feature of this embodiment is summarized as a radio base station eNB including a setting unit 11 configured to be able to set information elements in an "RRCConnectionReconfiguration (connection reconfiguration signal);" and a transmission unit 12 configured to transmit the "RRCConnectionReconfiguration" to a mobile station UE. Here, the setting unit 11 is configured to be able to set a "MeasConfig (measurement configuration information element)" and a "includeLocInfo (location information attachment information element)" to the "RRCConnectionReconfiguration," the setting unit 11 is configured to be able to set "MeasObjectId (measurement target information)" identifying a "MeasOBject (measurement target)" for a "(MDT) MeasurementReport (measurement report)", "ReportConfigId (report configuration information)" identifying a "ReportConfig (report condition)" for the "(MDT) MeasurementReport," and a "MeasId (measurement ID)" associating the "MeasObjectID" and the "ReportConfigID" with each other, to the "MeasConfig," and the setting unit 11 is configured to be able to indicate in the "includeLocInfo" that location information on the mobile station UE is to be attached to the "(MDT) MeasurementReport."

A second feature of this embodiment is summarized as a radio base station eNB including a setting unit 11 configured to be able to set information elements in an "RRCConnectionReconfiguration" to be transmitted to a mobile station UE; and a transmission unit 12 configured to transmit the "RRCConnectionReconfiguration" to the mobile station UE. Here, when a "MeasObject#1" for a "(MDT) MeasurementReport," a "ReportConfig#1" for the "(MDT) MeasurementReport," and a "MeasId#1" associating the "MeasObject#1" and the "ReportConfig#1" with each other are set as measurement configuration information for the mobile station UE, the setting unit 11 is configured to set a "reportConfigToAddModList (report configuration addition information element)" and a "measIdToAddModList (measurement ID addition information element)" to a "MeasConfig" in the "RRCConnectionReconfiguration," the "reportConfigToAddModList" commanding to add a "ReportConfig#2" having the same content as the aforementioned "ReportConfig#1," the "measIdToAddModList" commanding to add a "MeasId#2" associating the "MeasObject#1" and the "ReportConfig#2," and the setting unit 11 is configured to set a "includeLocInfo" to a "ReportConfigEUTRA (report configuration information element)" for the "ReportConfig#2" contained in the "reportConfigToAddModList," the "includeLocInfo" indicating that location information on the mobile station UE is to be attached to the "(MDT) MeasurementReport."

A third feature of this embodiment is summarized as a radio base station eNB including a setting unit 11 configured to be able to set information elements in an "RRCConnectionReconfiguration" to be transmitted to a mobile station UE; and a transmission unit 12 configured to transmit the "RRCConnetionReconfiguration" to the mobile station UE. Here, when a "MeasObject#1" for a "(MDT) MeasurementReport," a "ReportConfig#1" for the "(MDT) MeasurementReport," and a "MeasId#1" associating the "MeasObject#1" and the "ReportConfig#1" with each other are set as measurement configuration information for the mobile station UE, the setting unit 11 is configured to set a "reportConfigToAddModList (report configuration change information element)" to a "MeasConfig" within the "RRCConnectionReconfigration," the "reportConfigToAddModList" commanding to change a content of the "ReportConfig#1," the setting unit 11 is configured to set a "ReportConfigEUTRA" for the "ReportConfig#1" on to the "reportConfigToAddModList," and the setting unit 11 is configured to set a "includeLocInfo" to the "ReportConfigEUTRA," the "includeLocInfo" indicating that location information on the mobile station UE is to be attached to the "(MDT) MeasurementReport."

It should be noted that the foregoing operations of the mobile station UE, the radio base station eNB, and the operation and maintenance server OAM may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE, the radio base station eNB, and the operation and maintenance server OAM. Otherwise, the storage medium and the processor may be provided as discrete components inside the mobile station UE, the radio base station eNB, and the operation and maintenance server OAM.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-173356 (filed on Aug. 3, 2012) is incorporated by reference in the present specification.

INDUSTRIAL APPLICABILITY

As described above, the present invention can provide a radio base station capable of acquiring location information on a mobile station UE along with "(MDT) MeasurementReport" for all "Trigger Types" in "Immediate MDT."

EXPLANATION OF THE REFERENCE NUMERALS

UE mobile station
eNB radio base station
OAM operation and maintenance server
11 setting unit
12 transmission unit
13 reception unit
14 management unit

The invention claimed is:

1. A radio base station comprising:
a setting unit configured to be able to set information elements in a connection reconfiguration signal to be transmitted to a mobile station; and
a transmission unit configured to transmit the connection reconfiguration signal to the mobile station, wherein
when a first measurement target for a measurement report, a first report condition for the measurement report, and a first measurement ID associating the first measurement target and the first report condition with each other are set as a measurement configuration information element for the mobile station,
the setting unit is configured to set a report configuration addition information element and a measurement ID addition information element to the measurement configuration information element in the connection reconfiguration signal, the report configuration addition information element commanding to add a second report condition having the same content as the first report condition, and the measurement ID addition information element commanding to add a second measurement ID associating the first measurement target and the second report condition, and
the setting unit is configured to set a first location information attachment information element to a report configuration information element for the second report condition contained in the report configuration addition information element and set a second location information attachment information element in the connection reconfiguration signal, the second location information attachment information element indicating that location information on the mobile station is to be attached to the measurement report.

* * * * *